United States Patent [19]

Hallqvist

[11] Patent Number: 4,641,413
[45] Date of Patent: * Feb. 10, 1987

[54] TOOL CHANGER

[75] Inventor: Ellert Hallqvist, Västerås, Sweden

[73] Assignee: SMT Machine Company AB, Sweden

[*] Notice: The portion of the term of this patent subsequent to Feb. 10, 2002 has been disclaimed.

[21] Appl. No.: 528,997

[22] Filed: Sep. 2, 1983

Related U.S. Application Data

[63] Continuation-in-part of Ser. No. 262,733, May 12, 1981, abandoned.

[30] Foreign Application Priority Data

May 13, 1980 [SE] Sweden ............................. 8003582

[51] Int. Cl.⁴ .......................... B23Q 3/155; B23Q 7/04
[52] U.S. Cl. .......................................... 29/568; 82/2.7; 414/736
[58] Field of Search ........................ 29/568, 26 A, 563; 82/2.7, 2.5; 414/590, 736

[56] References Cited
U.S. PATENT DOCUMENTS 3,550,487 12/1970 Randall et al. .................... 29/568 X
4,302,144 11/1981 Hallqvist ............................ 29/568 X Primary Examiner—Z. R. Bilinsky
Attorney, Agent, or Firm—Townsend and Townsend

[57] ABSTRACT

The disclosure relates to a tool changer which is disposed at a workpiece exchanger for machine tools. The workpiece exchanger is intended for automatic exchange of workpieces intended for fixedly clamping between the tailstock and/or chuck and comprises a carriage drivable in the longitudinal direction of the lathe, a slide vertically movable along the carriage, and a gripping device disposed on the slide. The gripping device is rotatable about a horizontal axis and has first and second jaw pairs which are horizontally shiftable parallel to and disposed on opposite sides of the above-mentioned axis.

The tool changer according to the invention includes a pair of gripping means disposed on each jaw pair, the gripping devices of the gripping means being movable with the jaws for the purposes of tool change.

4 Claims, 1 Drawing Figure

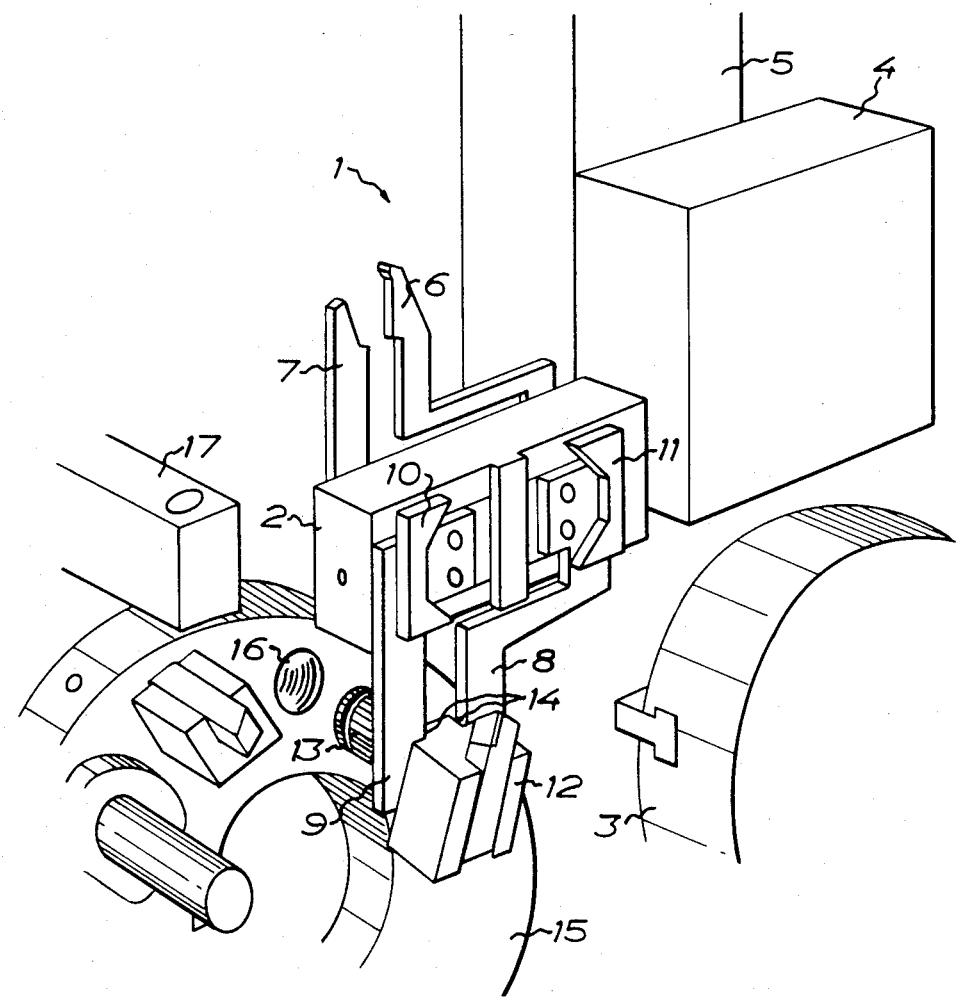

TOOL CHANGER

This is a continuation-in-part of application Ser. No. 262,733 filed May 12, 1981, now abandoned.

The present invention relates to a tool changer in a workpiece exchanger for machine tools, the workpiece exchanger being intended for automatic exchange of workpieces intended for clamping between the tailstock centre and/or chuck, and including a carriage drivable in the longitudinal direction of the lathe, a slide vertically movable along the carriage, and a jawed device disposed on the slide and rotatable about a horizontal axis and having first and second jaw pairs which are horixontally shiftable parallel to and disposed on opposite sides of this axis.

A workpiece exchanger for a program-controlled tool machine, for example, an NC lathe, is operative to remove a finished workpiece from the machine tool and deposit a new blank workpiece automatically for placing under tension on the machine tool.

Such a workpiece exchanger is shown in Swedish Patent Application No. 7900679-7 which permits production with a limited workforce for a certain time. One restricting factor may be the working life of the tool. This problem may be solved by replacing the worn out tool by a duplicate tool which, in such an instance, may initially have been mounted in the tool turret of the machine. However, this capacity allows of but a small number of duplicate tools and does not constitute a general solution to this problem.

The object of the present invention is to realize a tool changer which permits the availability of as many reserve tools as can be accommodated in the tool turret. This object is achieved according to the invention in that the tool changer includes a pair of gripping devices disposed on each jaw pair, the gripping devices being movable with the jaws for the purposes of tool changing.

The invention will be described in greater detail below with reference to the accompanying drawing which shows a partial perspective view of one preferred embodiment of a tool changer according to the invention disposed on a workpiece exchanger.

A workpiece exchanger 1 for a tool machine comprises a double-sided indexable gripping device 2 which is operative to grip a workpiece (not shown) in order to remove it from or move it to a chuck 3, respectively, a vertically movable slide 4 and a reciprocally drivable carriage (not shown) provided with a downwardly directed arm 5.

The slide 4 and the arm 5 are moved as follows. The arm 5 is affixed to a carriage which is adapted to travel along the horizontal rails attached to the machine tool. The traveling motion of the carriage is driven by conventional means such as, for example, a d.c. servomotor. The vertical slide 4 is adapted to travel along vertical guides attached to the carriage arm 5. The vertical traveling motion is also driven according to conventional means such as, for example, a d.c. servomotor. Actuation, operation and control of the servomotors is readily achieved by use of a simple conventional computer program.

The gripping device 2 consists, in principle, of two double-jaw chucks whose jaws or fingers are replaceable by adjustable V blocks on basic jaws. They are capable of applying tension both on an exterior and on an interior diameter. The jaws are actuated as follows. Each jaw in any given pair is affixed to a horizontal bar inside the jaw mount 2. Each bar has a series of teeth extending from one side thereof. The bars for each jaw pair are positioned on opposite sides of a cog wheel with the teeth on each bar facing each other and engaged with the wheel. The bars are then moved in opposite directions by turning the wheel. This opens and closes the jaws while keeping them centered. The cog wheels are operated and controlled by conventional motor driven means such as, for example, a hydraulic motor, which is in turn controlled by a computer program. The two double-jaw chucks are built-in on either side of the indexable shaft. This can be positioned in four different angular positions (0°–90°–180°–270°). Rotation is effected hydraulically, like operation of the double-jaw chucks.

Thus, the apparatus has five degrees of freedom, namely two for the finger movements of the double-sided gripping device, one for the rotation (four index positions) of the gripping device about its horizontal axis, one for raising and lowering of the gripping device along the vertical guide on the downwardly directed arm of the carriage, and one for the horizontal movement of the carriage in the longitudinal direction of the machine.

Of the two jaw pairs of the gripping device, the one pair is intended for feeding in blank workpieces and the other for discharging processed workpieces to and from the chuck of the machine tool, respectively. Exchange takes place in that the shaft of the gripping device is indexed through 180°. This indexing is preceded by a horizontal withdrawal movement from the chuck jaws, that is to say a removal of the workpiece from the chuck, and a possible movement of the vertical slide. This latter is applicable to short tailstock workpieces in which the tailstock movement may be insufficient to expose the field of pivot of the workpiece. It is presupposed, here, that the field of pivot of the workpiece is free.

If the transverse slide or other part of the machine is placed just beneath or above the working area of the machine such that the field of pivot is not free, the vertical slide must be moved upwardly or downwardly, in order to carry out the above-mentioned indexing.

On discharge of workpieces, the vertical movement is employed in order to be able to pass a possible tailstock and/or the tool turret. The vertical movement is also employed for positioning of the gripping fingers at the removal and deposit positions. As a result of the NC control, the movement pattern in these operations may be complicated and nevertheless permit simple programming.

By providing the workpiece exchanger with a tool changer according to the invention which, substantially, consists of an extra set of jaws or shanks 6, 7, 8 and 9, and which, in the preferred embodiment as shown on the figure, are directed at right angles to the standard jaws 10, 11, the workpiece exchanger may also be utilized for exchange from a worn tool to a duplicate tool. These reserve tools are collected in a magazine, for example, of the turret type. The tool holders or cassettes 12 are of an already standard type with, for example, a cylindrical, toothed shaft 13 as clamping portion. In order to make for automatic handling of the cassettes, they have, however, for this purpose been provided with a pair of gripping grooves 14 in the cassette body immediately outside the shaft portion. The shanks of the gripping device can engage with these gripping grooves and withdraw or project in the cylindrical pin in one of the tool positions 16 of the tool turret 15. However, prior to withdrawal, the toothed locking device (not shown) which fixedly locks the cassette shaft in the turret disk must be released. This is effected automatically in that a driving key (not shown) disposed on a turning mechanism 17 is moved down into the key engagement of the locking device, whereupon unlocking may be carried out.

The locking of the tools in the turret disk and the release of the tools therefrom occurs as follows. The turret disk contains a series of radially directed bores extending inward toward the center from opening at the rim of the disk, one such bore opening at its side into each of the tool positions. Within each channel is a plunger containing gears which mate with the teeth on the shaft 13 of each tool cassette. The outward end of each plunger protrudes beyond the rim of the turret disk and mates with the turning mechanism 17. When the latter is turned about a radial axis, the plunger is rotated and the gears drive the cssette shaft along the direction of its axis. The tool to which the plunger is engaged is thus moved into or out of its corresponding hole in the turret disk. When the outward end of the plunger is not engaged with the turning mechanism, the gears have a locking effect on the tools, securing them in their respective holes in the turret disk. On the other hand, once the turning mechanism 17 has been sufficiently turned to free the gears from the toothed portion of the cylindrical cassette shaft, the cassette is now free and may be drawn out from the turret disk. The gripping device indexes through 180° and advances the duplicate tool into position for fitting and locking in the turret disk. The turning mechanism is released and the worn out tool is moved back to the tool magazine. Tool change can be ordered from the control equipment and the time for such change may either be determined by a programmed use time or by a continuous condition supervision of the tool tip.

Although the preferred embodiment calls for the use of a separate turning mechanism 17 for fixedly locking the tool in the intended position, it is also possible to arrange this in another manner. For example, the shanks 6, 7, 8 and 9 can urge bosses into the grooves 14 when they are moved therein, the bosses acting on a locking device disposed in the shaft 13 for locking the tool in the grip 16.

The apparatus is not, naturally, restricted to the embodiment described above and shown on the drawing, but may be modified without departing from the spirit and scope of the appended claims.

What I claim and desire to secure by Letters Patent is:

1. In a workpiece exchanger apparatus for automatic exchange of workpieces to be secured in an automatic machine tool with longitudinal rails, said exchanger comprising a carriage mounted on said rails, means for driving said carriage along said rails, a slide mounted on said carriage, means for moving said slide vertically along said carriage, first and second jaw pairs mounted on a jaw mount extending laterally from said slide to grip longitudinally oriented workpieces, means for sliding said jaw pairs in the horizontal direction transverse to said rails, and means for rotating said jaw pairs about a horizontal axis transverse to said rails, the improvement comprising a pair of gripping devices secured to each jaw pair, each said pair of gripping devices adapted to grip a tool.

2. The apparatus of claim 1 in which each said pair of gripping devices is comprised of a pair of shanks disposed between each said jaw pair and said jaw mount.

3. The apparatus of claims 1 or 2 further comprising means for locking said tool in and unlocking said tool from a turret head.

4. The apparatus of claims, 1 or 2 in which each said gripping device operates through a tool holder extending from said tool and adapted for insertion into a turret head, and further comprising means for locking said holder in and releasing said holder from said turret head, said means being activated upon the grasping of said tool holder by said gripping device.

* * * * *